United States Patent
Han

(10) Patent No.: US 10,733,720 B2
(45) Date of Patent: Aug. 4, 2020

(54) METHOD AND APPARATUS FOR TESTING ACCURACY OF HIGH-PRECISION MAP

(71) Applicant: Baidu Online Network Technology (Beijing) Co., Ltd., Beijing (CN)

(72) Inventor: Fenghui Han, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 322 days.

(21) Appl. No.: 15/593,660

(22) Filed: May 12, 2017

(65) Prior Publication Data
US 2018/0158206 A1 Jun. 7, 2018

(30) Foreign Application Priority Data
Dec. 2, 2016 (CN) .......................... 2016 1 1112125

(51) Int. Cl.
*G06T 7/00* (2017.01)
*G01C 21/32* (2006.01)

(52) U.S. Cl.
CPC ............ *G06T 7/0004* (2013.01); *G01C 21/32* (2013.01); *G06T 2200/04* (2013.01); *G06T 2207/10024* (2013.01); *G06T 2207/10028* (2013.01); *G06T 2207/30168* (2013.01); *G06T 2207/30256* (2013.01)

(58) Field of Classification Search
CPC ......... G06T 2207/10028; G06T 7/0004; G06T 2207/30256; G06T 2207/10024; G06T 2207/30168; G06T 2200/04; G01C 21/00
See application file for complete search history.

(56) References Cited

U.S. PATENT DOCUMENTS

| 8,494,285 B2 * | 7/2013 | Zhang ..................... G06T 7/162 |
| | | 382/195 |
| 9,256,961 B2 * | 2/2016 | Lynch .................. G09B 29/007 |
| 2007/0065002 A1 * | 3/2007 | Marzell .................. G06T 17/00 |
| | | 382/154 |

(Continued)

OTHER PUBLICATIONS

Boyko, Aleksey, and Thomas Funkhouser. "Extracting roads from dense point clouds in large scale urban environment." ISPRS Journal of Photogrammetry and Remote Sensing 66.6 (2011): S2-S12. (Year: 2011).*

(Continued)

*Primary Examiner* — Pinalben Patel
(74) *Attorney, Agent, or Firm* — Knobbe, Martens, Olson & Bear LLP

(57) ABSTRACT

Disclosed embodiments relate to a method and an apparatus for testing accuracy of a high-precision map. In some embodiments, the method includes: reverting the high-precision map to a road network map; acquiring a 3D point cloud road image labeled with an actual coordinate of a map element; fitting the 3D point cloud road image into the road network map to obtain a road network map with the fitted 3D point cloud road image; calculating a differential between the actual coordinate of the 3D point cloud road image in the road network map with the fitted 3D point cloud road image and a map coordinate in the road network map; and determining the high-precision map as being accurate in response to the differential being less than or equal to a preset threshold.

15 Claims, 6 Drawing Sheets

(56) References Cited

U.S. PATENT DOCUMENTS

| | | | | |
|---|---|---|---|---|
| 2010/0034426 A1* | 2/2010 | Takiguchi | ............ | G01C 21/3602 |
| | | | | 382/106 |
| 2010/0283781 A1* | 11/2010 | Kriveshko | .............. | G06T 17/00 |
| | | | | 345/419 |
| 2012/0135745 A1* | 5/2012 | Kaplan | ................... | G01C 21/32 |
| | | | | 455/456.1 |
| 2013/0216089 A1* | 8/2013 | Chen | ..................... | G06T 7/0002 |
| | | | | 382/100 |
| 2014/0379254 A1* | 12/2014 | Miksa | ..................... | G01C 21/32 |
| | | | | 701/450 |
| 2018/0321364 A1* | 11/2018 | Sasaki | ..................... | G01S 17/42 |
| 2019/0163990 A1* | 5/2019 | Mei | ..................... | G06K 9/00798 |

OTHER PUBLICATIONS

Ilci, Veli, and Charles Toth. "High Definition 3D Map Creation Using GNSS/IMU/LiDAR Sensor Integration to Support Autonomous Vehicle Navigation." Sensors 20.3 (2020): 899. (Year: 2020).*

* cited by examiner

METHOD AND APPARATUS FOR TESTING ACCURACY OF HIGH-PRECISION MAP

CROSS-REFERENCE TO RELATED APPLICATIONS

This application claims the benefit of Chinese Patent Application No. 201611112125.9, entitled "Method and Apparatus for Testing Accuracy of High-Precision Map," filed on Dec. 2, 2016, which is hereby incorporated by reference in its entirety.

TECHNICAL FIELD

The present disclosure relates to the field of test technologies, particularly to the field of map test technologies, and more particularly, to a method and an apparatus for testing accuracy of a high-precision map.

BACKGROUND

A high-precision map for use in autonomous cars is required to determine whether road coordinates, road signal lamps, identification characters, coordinates, digital information are discrepant with the actual roads.

At present, when it is determined that there is a discrepancy between the high-precision map and an actual road, the map is in general manually checked so that map data are reverted to a road network for inspection.

However, the existing method for determining discrepancy between the high-precision map and an actual road is incapable of verifying coordinates in the high-precision map, low in efficiency of verifying whether there is a discrepancy between road information of the high-precision map and the actual road, and incapable of verifying the accuracy of the map.

SUMMARY

An objective of the present application is to provide an improved a method and an apparatus for testing accuracy of a high-precision map, in order to solve the technical problem mentioned in the foregoing Background section.

In some embodiments, the present disclosure provides a method for testing accuracy of a high-precision map. The method comprises: reverting the high-precision map to a road network map; acquiring a 3D point cloud road image labeled with an actual coordinate of a map element; fitting the 3D point cloud road image into the road network map to obtain a road network map with the fitted 3D point cloud road image; calculating a differential between the actual coordinate in the 3D point cloud road image in the road network map with the fitted 3D point cloud road image and a map coordinate in the road network map; and determining the high-precision map as being accurate in response to the differential being less than or equal to a preset threshold.

In some embodiments, the acquiring a 3D point cloud road image labeled with an actual coordinate comprises: obtaining the 3D point cloud road image by scanning 3D point cloud information of an actual road via an acquisition device; calculating a coordinate, in a world coordinate system, of each point datum in the 3D point cloud road image; and labeling the 3D point cloud road image according to the coordinate, in the world coordinate system, of each point datum in the 3D point cloud road image to obtain the 3D point cloud road image labeled with an actual coordinate.

In some embodiments, the calculating a differential between the actual coordinate in the 3D point cloud road image in the road network map with the fitted 3D point cloud road image and a map coordinate in the road network map comprises: rotating and translating a road network map element in the road network map with the fitted 3D point cloud road image to obtain a mapped point, in the 3D point cloud road image, of the road network map element; and calculating a differential between a single mapped point and a point on the 3D point cloud road image coinciding with the mapped point in response to the single mapped point coinciding in whole or in part with a point in the 3D point cloud road image.

In some embodiments, the calculating a differential between the actual coordinate of the 3D point cloud road image in the road network map with the fitted 3D point cloud road image and a map coordinate in the road network map further comprises: calculating a differential between a single mapped point and a point, on the 3D point cloud road image, positioned in a normal direction of the single mapped point and closest to the single mapped point in response to the single mapped point not coinciding with a point in the 3D point cloud road image.

In some embodiments, the method further comprises: determining the high-precision map as being inaccurate in data in response to the differential being greater than the preset threshold.

In some embodiments, the differential comprises at least one of: a Euclidean distance, an angle differential in a vector direction, and a height differential in a world coordinate system.

In some embodiments, the determining the high-precision map as being accurate in response to the differential being less than or equal to the preset threshold comprises: determining the high-precision map as being accurate in data in response to each item in the differential being respectively less than or equal to an accurate threshold of the each item. The each item in the differential being less than or equal to an accurate threshold of the each item comprises at least one of: the Euclidean distance being less than or equal to a Euclidean distance threshold; the angle differential being less than or equal to an angle differential threshold; and the height differential being less than or equal to a height differential threshold.

In some embodiments, the determining the high-precision map as being inaccurate in data in response to the differential being greater than the preset threshold comprises: determining the high-precision map as being inaccurate in data in response to any item in the differential being greater than an accurate threshold of the any item. The any item in the differential being greater than the accurate threshold of the any item comprises at least one of: the Euclidean distance being greater than the Euclidean distance threshold; the angle differential being greater than the angle differential threshold; and the height differential being greater than the height differential threshold.

In some embodiments, the present disclosure provides an apparatus for testing accuracy of a high-precision map. The apparatus comprises: a road network reverting unit, configured to revert the high-precision map to a road network map; an image acquiring unit, configured to acquire a 3D point cloud road image labeled with an actual coordinate of a map element; a map fitting unit, configured to fit the 3D point cloud road image into the road network map to obtain a road network map with the fitted 3D point cloud road image; a differential calculating unit, configured to calculate a differential between the actual coordinate of the 3D point cloud road image in the road network map with the fitted 3D point cloud road image and a map coordinate in the road network map; and an accuracy determining unit, configured to determine the high-precision map as being accurate in response to the differential being less than or equal to a preset threshold.

In some embodiments, the image acquiring unit comprises: a scanning subunit, configured to scan 3D point cloud information of an actual road via an acquisition device to obtain the 3D point cloud road image; a coordinate calculating subunit, configured to calculate a coordinate, in the world coordinate system, of each point datum in the 3D point cloud road image; and a labeling subunit, configured to label the 3D point cloud road image according to the coordinate, in the world coordinate system, of each point datum in the 3D point cloud road image to obtain the 3D point cloud road image labeled with an actual coordinate.

In some embodiments, the differential calculating unit comprises: a registrating subunit, configured to rotate and translate a road network map element in the road network map with the fitted 3D point cloud road image to obtain a mapped point, in the 3D point cloud road image, of the road network map element; and a coincidence calculating subunit, configured to calculate a differential between a single mapped point and a point on the 3D point cloud road image coinciding with the mapped point in response to the single mapped point coinciding in whole or in part with a point in the 3D point cloud road image.

In some embodiments, the differential calculating unit further comprises: a noncoincidence calculating subunit, configured to calculate a differential between a single mapped point and a point, on the 3D point cloud road image, positioned in a normal direction of the single mapped point and closest to the single mapped point in response to the single mapped point not coinciding with a point in the 3D point cloud road image.

In some embodiments, the apparatus further comprises: an inaccuracy determining unit, configured to determine the high-precision map as being inaccurate in data in response to the differential being greater than the preset threshold.

In some embodiments, the differential obtained by calculating by the differential calculating unit comprises at least one of: a Euclidean distance, an angle differential in a vector direction, and a height differential in a world coordinate system.

In some embodiments, the accuracy determining unit is further configured to: determine the high-precision map as being accurate in data in response to each item in the differential being respectively less than or equal to an accurate threshold of the each item. The each item in the differential being less than or equal to an accurate threshold of the each item comprises at least one of: the Euclidean distance being less than or equal to a Euclidean distance threshold; the angle differential being less than or equal to an angle differential threshold; and the height differential being less than or equal to a height differential threshold.

In some embodiments, the inaccuracy determining unit is further configured to: determine the high-precision map as being inaccurate in data in response to any item in the differential being greater than an accurate threshold of the any item. The any item in the differential being greater than the accurate threshold of the any item includes at least one of: the Euclidean distance being greater than the Euclidean distance threshold; the angle differential being greater than the angle differential threshold; and the height differential being greater than the height differential threshold.

According to the method and apparatus for testing accuracy of a high-precision map provided by the present disclosure, the high-precision map is first reverted to a road network map, then a 3D point cloud road image labeled with an actual coordinate is acquired, then the 3D point cloud road image is fitted into the road network map to obtain a road network map with the fitted 3D point cloud road image, then a differential between the actual coordinate labeled in the 3D point cloud road image and a coordinate in the road network map with the fitted 3D point cloud road image is calculated, and finally the high-precision map is determined as being accurate in response to the differential being less than or equal to a preset threshold. In this way, verification of coordinates of a high-precision map may be implemented, efficiency in verifying whether there is a difference between road information on the high-precision map and an actual road may be improved, verification errors caused by manual verification may be avoided, and accuracy in verifying the high-precision map may be enhanced.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and some embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and the features in some embodiments may be combined with each other. The present disclosure will be described below in detail with reference to the accompanying drawings and in combination with some embodiments.

Figure 1:
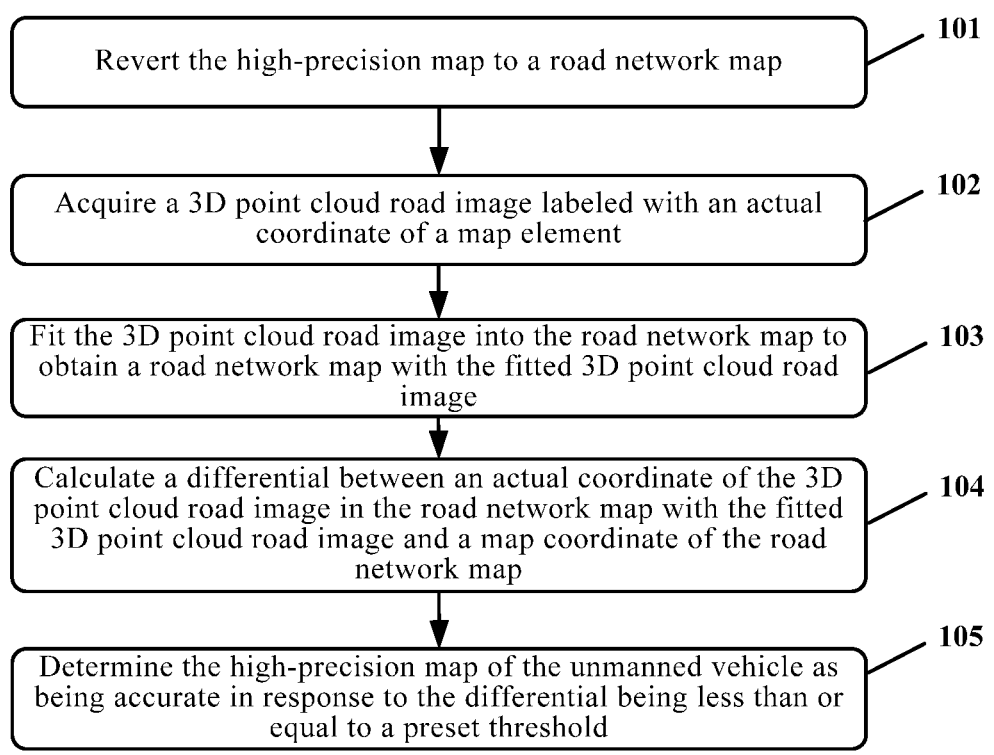
FIG. 1 is a schematic flowchart of a method for testing accuracy of a high-precision map according to some embodiment of the present disclosure.

FIG. 1 illustrates a flowchart 100 of a method for testing accuracy of a high-precision map according to some embodiments of the present disclosure. The method for testing accuracy of a high-precision map may include following steps.

Step 101: reverting the high-precision map to a road network map.

In some embodiments, the high-precision map refers to a machine-based high-precision map used in autonomous cars, generally including an absolute precision in the sub-meter range, for example, a precision within one meter, for example, within 20 centimeters; and a higher transversal relative precision (for example, a relative positional precision between two vehicle lanes, or between a vehicle lane and a vehicle lane line) in most cases. Furthermore, the high-precision map includes high-precision coordinates and includes accurate road shape, and comprises data such as gradient, curvature, direction, elevation and heeling of each lane. The high-precision map not only depicts a road, but also depicts how many lanes are on the road, truly reflecting the actual form of the road. For example, the real road is widened in some places, accordingly the road in the high-precision map is widened. When the real road is narrowed in some places due to confluence, accordingly the road in the high-precision map is also narrowed due to the confluence. In addition, whether the vehicle lane line between the vehicle lanes is a dotted line, a solid line or a yellow double line, the color of the lines, the median divider, the material of the median divider, the appearance and material of the curb, even arrows, textual contents and their positions on the roads are described on the high-precision map. Furthermore, in consideration of the autonomous driving, for example, the speed limit for each lane, and the recommended speed also need to be provided. Absolute geographical coordinates and physical sizes of pedestrian crosswalks, billboards along the roads, median dividers, speed limit signs, traffic lights, roadside telephone booths that are generally collectively referred to as traffic participation objects as well as features and characteristics thereof are also present in the data of the high-precision map. Meanwhile, the high-precision map includes a function of assisting in achieving high-precision position locating, a planning capability at road levels and lane levels, and a guidance capability at lane levels.

The road network map herein refers to a map of a network system reverted from the high-precision map and composed of roads at various levels. It should be appreciated that the road network map herein also includes road-related data at the road and lane levels in the high-precision map.

Step 102: acquiring a 3D point cloud road image labeled with an actual coordinate.

In some embodiments, the 3D point cloud road image may be obtained by scanning an actual road by an airborne 3D scanner in a manned aerial vehicle or an unmanned aerial vehicle or by a terrestrial 3D scanner mounted in a capturing vehicle (for example, obtained by scanning an actual road using a laser scanner or a laser radar scanner). The acquired scanning data of mass point data may be recorded in the form of points. Each point comprises a three-dimensional coordinate. Some points may comprise color information (RGB) or reflection intensity information. When the 3D point cloud road image is labeled, the three-dimensional coordinate may be transformed into a coordinate in the world coordinate system based on a mapping relation between the coordinate system where the three-dimensional coordinate comprised in the point data is and the world coordinate system, to obtain the actual coordinate of the 3D point cloud road image.

In some alternative implementations, the acquiring a 3D point cloud road image labeled with an actual coordinate includes: obtaining the 3D point cloud road image by scanning 3D point cloud information of an actual road via an acquisition device; calculating a coordinate, in the world coordinate system, of each point datum in the 3D point cloud road image; and labeling the 3D point cloud road image according to the coordinate, in the world coordinate system, of each point datum in the 3D point cloud road image to obtain the 3D point cloud road image labeled with an actual coordinate.

In this implementation, the coordinate, in the world coordinate system, of each point datum of the 3D point cloud road image is the actual coordinate of the point datum. Therefore, the 3D point cloud road image labeled with an actual coordinate may be obtained by labeling the 3D point cloud road image using the coordinate, in the world coordinate system, of each point datum of the 3D point cloud road image, thereby implementing acquiring the accurate actual coordinate of the 3D point cloud road image and providing an accurate criterion for subsequently testing accuracy of the high-precision map.

Step 103: fitting the 3D point cloud road image into the road network map to obtain a road network map with the fitted 3D point cloud road image.

In some embodiments, after acquiring the road network map and the 3D point cloud road image labeled with the actual coordinate, the road network map and the 3D point cloud road image labeled with the actual coordinate may be fitted. The method for fitting the road network map and the 3D point cloud road image may be implemented by using a spline interpolation curve fitting method in the present or future developed technologies, and is not limited by the present disclosure. For example, each point datum in the 3D point cloud road image may be fitted into the road network map by using a B-spline. When fitting, the actual coordinate of the 3D point cloud road image may be first transformed into a coordinate in the road network map, then the 3D point cloud road image is fitted into the road network map based on the transformed coordinate.

Step 104: calculating a differential between the actual coordinate labeled in the 3D point cloud road image and the coordinate in the road network map with the fitted 3D point cloud road image.

In some embodiments, after obtaining the road network map with the fitted 3D point cloud road image, a differential between the actual coordinate of a map element of the 3D point cloud road image in the road network map with the fitted 3D point cloud road image and a map coordinate of the map element in the road network map may be calculated.

In some alternative implementations, the differential may include a Euclidean distance. Alternatively or additionally, the differential may include an angle differential in a vector direction. Alternatively or additionally, the differential may include a height differential in a world coordinate system.

Step 105: determining the high-precision map as being accurate in response to the differential being less than or equal to a preset threshold.

In some embodiments, the preset threshold refers to a critical threshold for deciding whether the high-precision map is inaccurate in data. When the differential is less than or equal to the preset threshold, this indicates that the actual coordinate coincides with the map coordinate or an overlapping region is greater than a certain threshold, that is, the map data accuracy conforms to the requirement, and thus the high-precision map may be determined as being accurate.

In some alternative implementations, in response to the foregoing differential including any one item of the Euclidean distance, the angle differential in the vector direction and the height differential in the world coordinate system, when the any one item is less than or equal to the accurate threshold of the any one item, the high-precision map is determined as being accurate. In response to the foregoing differential merely including the Euclidean distance, when the Euclidean distance is less than or equal to a Euclidean distance threshold, the high-precision map is determined as being accurate. In response to the foregoing differential merely including the angle differential in the vector direction, when the angle differential is less than or equal to an angle differential threshold, the high-precision map is determined as being accurate. In response to the foregoing differential merely including the height differential in the world coordinate system, when the height differential is less than or equal to a height differential threshold, the high-precision map is determined as being accurate.

In response to the foregoing differential including two items of the Euclidean distance, the angle differential in the vector direction and the height differential in the world coordinate system, when each item included in the two items is respectively less than or equal to the accurate threshold of the each item, the high-precision map is determined as being accurate. In response to the foregoing differential including the Euclidean distance and the angle differential in the vector direction, when the Euclidean distance is less than or equal to the Euclidean distance threshold and the angle differential is less than or equal to the angle differential threshold, the high-precision map is determined as being accurate. In response to the foregoing differential including the angle differential in the vector direction and the height differential in the world coordinate system, when the angle differential is less than or equal to the angle differential threshold and the height differential is less than or equal to the height differential threshold, the high-precision map is determined as being accurate. In response to the foregoing differential including the Euclidean distance and the height differential in the world coordinate system, when the Euclidean distance is less than or equal to the Euclidean distance threshold and the height differential is less than or equal to the height differential threshold, the high-precision map is determined as being accurate.

In response to the foregoing differential including the Euclidean distance, the angle differential in the vector direction and the height differential in the world coordinate system, when each item is respectively less than or equal to the accurate threshold of the each item, the high-precision map is determined as being accurate. That is, in response to the foregoing differential including the Euclidean distance, the angle differential in the vector direction and the height differential in the world coordinate system, the high-precision map is determined as being accurate when all the following three items are satisfied: the Euclidean distance being less than or equal to the Euclidean distance threshold; the angle differential being less than or equal to the angle differential threshold; and the height differential being less than or equal to the height differential threshold.

Optionally, the foregoing method for testing accuracy of a high-precision map may further include: determining the high-precision map as being inaccurate in data in response to the differential being greater than the preset threshold.

Herein the preset threshold refers to a critical threshold for deciding whether the high-precision map is inaccurate in data. Therefore, the high-precision map may be determined as being inaccurate in data when the differential is greater than the critical threshold.

The determining the high-precision map as being inaccurate in data in response to the differential being greater than the preset threshold may include: determining the high-precision map as being inaccurate in data in response to any item included in the differential being greater than the accurate threshold of the any item.

The any item included in the differential being greater than the accurate threshold of the any item includes at least one of: the Euclidean distance being greater than the Euclidean distance threshold; the angle differential being greater than the angle differential threshold; and the height differential being greater than the height differential threshold. That is, the high-precision map is determined as being inaccurate in data in the event that at least one of the following occurs: the Euclidean distance being greater than the Euclidean distance threshold; the angle differential being greater than the angle differential threshold; and the height differential being greater than the height differential threshold.

According to the method and apparatus for testing accuracy of a high-precision map provided by some embodiments of the present disclosure, the high-precision map is first reverted to a road network map, then a 3D point cloud road image labeled with an actual coordinate of a map element is acquired, then the 3D point cloud road image is fitted into the road network map to obtain a road network map with the fitted 3D point cloud road image, then a differential between the actual coordinate labeled in the 3D point cloud road image and a coordinate in the road network map with the fitted 3D point cloud road image is calculated, and finally the high-precision map is determined as being accurate in response to the differential being less than or equal to a preset threshold. In this way, verification of coordinates of a high-precision map may be implemented, the efficiency in verifying whether there is a difference between road information of the high-precision map and the actual road may be improved, a verification error caused by manual verification can be avoided, and the accuracy in verifying the high-precision map may be improved.

Figure 2:
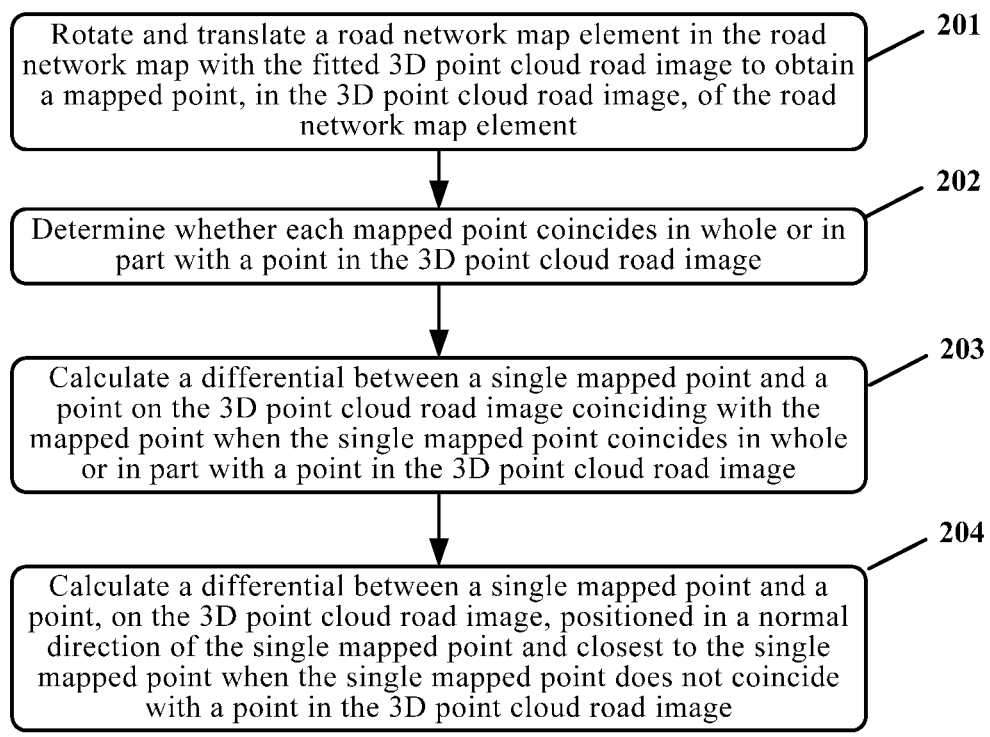
FIG. 2 illustrates a schematic flowchart of a method for calculating a differential between an actual coordinate in a 3D point cloud road image and a map coordinate in a road network map according to some embodiments.

Further referring to FIG. 2, which illustrates a flowchart 200 of a method for calculating a differential between an actual coordinate of a 3D point cloud road image in a road network map with the fitted 3D point cloud road image and a map coordinate in the road network map according to some embodiments of the present disclosure. The method for calculating a differential between an actual coordinate of a 3D point cloud road image in a road network map with the fitted 3D point cloud road image and a map coordinate in the road network map includes the following steps.

Step 201: rotating and translating a road network map element in the road network map with the fitted 3D point cloud road image to obtain a mapped point, in the 3D point cloud road image, of the road network map element.

In some embodiments, the mapped point, on the 3D point cloud road image, of the road network map element may be determined by rotating and translating the road network map element, wherein the rotation and translation technology may be a curve registration technology in the present or future developed technologies, and is not limited in the present disclosure. For example, the road network map element may be rotated and translated by using iterative closest point (ICP) to obtain the mapped point, in the 3D point cloud road image, of the road network map element.

Step 202: deciding whether each mapped point coincides in whole or in part with a point in the 3D point cloud road image.

In some embodiments, based on each mapped point obtained in Step 201, a coincidence relationship between the mapped point and an existing point in the 3D point cloud road image may be decided. Step 203 is executed if the decision result is yes, otherwise Step 204 is executed.

Step 203: calculating a differential between a single mapped point and a point on the 3D point cloud road image coinciding with the mapped point when the single mapped point coincides in whole or in part with a point in the 3D point cloud road image.

In some embodiments, when the single mapped point coincides in whole or in part with a point in the 3D point cloud road image, this indicates that a matching degree between the point datum of a map element in a road network element and the point datum of a map element in the 3D point cloud road image is higher, that is, the coordinate of the road network map element is relatively proximate to the coordinate of an actual map element. At this moment, it may be further determined whether the road network map is accurate depending on whether the differential between the two points conforming to the accurate threshold, thereby determining whether the high-precision map is accurate.

Step 204: calculating a differential between a single mapped point and a point, on the 3D point cloud road image, positioned in a normal direction of the single mapped point and closest to the single mapped point when the single mapped point does not coincide with a point in the 3D point cloud road image.

In some embodiments, when the single mapped point does not coincide with a point in the 3D point cloud road image, this indicates that the matching degree between the point datum of a map element in a road network element and the point datum of a map element in the 3D point cloud road image needs to be further determined, that is, it is needed to determine whether the road network map is accurate according to whether the differential between the two points conforming to the accurate threshold, thereby determining whether the high-precision map is accurate.

By using the method according to the forgoing embodiments of the present disclosure to calculate a differential between the actual coordinate of a 3D point cloud road image in a road network map with the fitted 3D point cloud road image and the map coordinate in the road network map, abundant and accurate parameters for determining the accuracy of the high-precision map may be provided, thereby improving the precision in determining the accuracy of the high-precision map.

Figure 3:
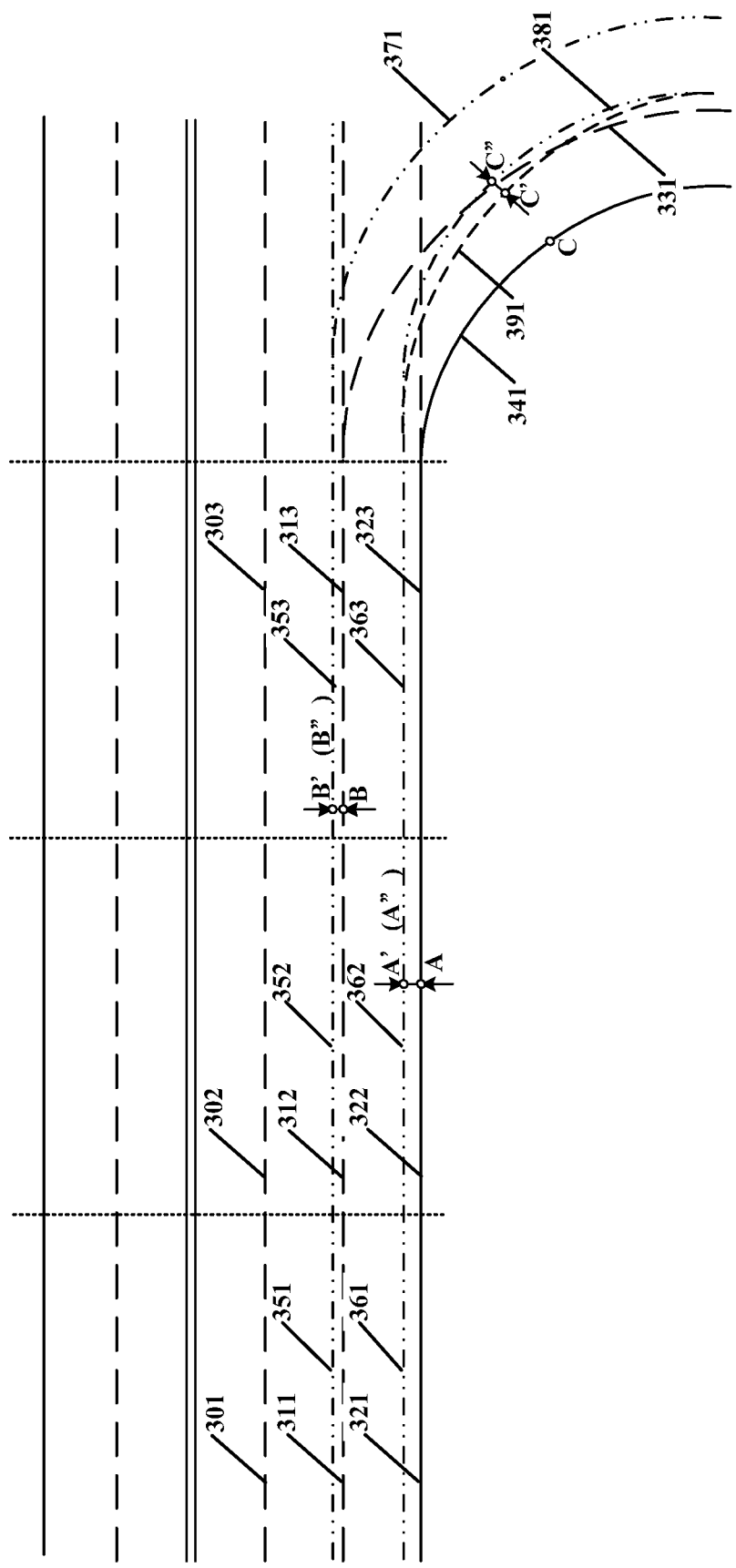
FIG. 3 illustrates a schematic application scenario of a method for testing accuracy of a high-precision map according to some embodiments of the present disclosure.

With reference to FIG. 3, an application scenario of a method for testing accuracy of a high-precision map is described in the following according to some embodiments of the present disclosure.

As shown in FIG. 3, after the actual coordinate of the point datum in the 3D point cloud road image is transformed into a coordinate in the road network map based on a mapping relation between the world coordinate system and the road network map coordinate system, and the 3D point cloud road image is fitted into the road network map, the road network map with the fitted 3D point cloud road image may include the original road network map and the 3D point cloud road image fitted into the road network map, wherein each point datum of the 3D point cloud road image includes the actual coordinate.

The original road network map includes vehicle lane lines 301, 302, 303, 311, 312, 313, 321, 322, 323, 331 and 341. The vehicle lane line 301 is a precursor of the vehicle lane line 302, the vehicle lane line 303 is a successor of the vehicle lane line 302. The vehicle lane line 311 is a precursor of the vehicle lane line 312, the vehicle lane line 313 is a successor of the vehicle lane line 312. The vehicle lane line 321 is a precursor of the vehicle lane line 322, the vehicle lane line 323 is a successor of the vehicle lane line 322. The vehicle lane line 331 is a precursor of the vehicle lane line 313, the vehicle lane line 341 is a successor of the vehicle lane line 323.

The 3D point cloud road image fitted into the road network map includes vehicle lane lines 351, 352, 353, 361, 362, 363, 371 and 381. The vehicle lane line 351 is a precursor of the vehicle lane line 352, the vehicle lane line 353 is a successor of the vehicle lane line 352. The vehicle lane line 361 is a precursor of the vehicle lane line 362, the vehicle lane line 363 is a successor of the vehicle lane line 362; and the vehicle lane line 371 is a successor of the vehicle lane line 353, the vehicle lane line 381 is a successor of the vehicle lane line 363.

Afterward, the differential between the road network map coordinate transformed from the actual coordinate labeled in the 3D point cloud road image and the coordinate in the original road network map (namely the differential between the actual coordinate labeled in the 3D point cloud road image and the coordinate in the road network map) may be calculated. In the figure, Point A represents a point on the vehicle lane line 322 of the road network map, Point A' represents a mapped point, on the vehicle lane line 362, of Point A, obtained by rotating and translating Point A, and Point A" represents a point labeled on the vehicle lane line 362 in the 3D point cloud road image. In the figure, Point A' coincides with Point A". The Euclidean distance, the angle differential in the vector direction and the height differential in the world coordinate system between Point A' and Point A" may be further calculated. When the Euclidean distance is less than or equal to a Euclidean distance threshold, the angle differential is less than or equal to an angle differential threshold, and the height differential is less than or equal to a height differential threshold, this indicates that the data of Point A is accurate. When the Euclidean distance is greater than or equal to the Euclidean distance threshold, the angle differential is greater than or equal to the angle differential threshold, or the height differential is greater than or equal to the height differential threshold, this indicates that the data of Point A is inaccurate.

Similarly, Point B represents a point on the vehicle lane line 313 of the road network map, Point B' represents a mapped point, on the vehicle lane line 353, of Point B, obtained by rotating and translating Point B, and Point B" represents a point labeled on the vehicle lane line 353 in the 3D point cloud road image. In the figure, Point B' coincides with Point B". The Euclidean distance, the angle differential in the vector direction and the height differential in the world coordinate system between Point B' and Point B" may be further calculated. When the Euclidean distance is less than or equal to the Euclidean distance threshold, the angle differential is less than or equal to the angle differential threshold, and the height differential is less than or equal to the height differential threshold, this indicates that the data of Point B is accurate. When the Euclidean distance is greater than or equal to the Euclidean distance threshold, the angle differential is greater than or equal to the angle differential threshold, or the height differential is greater than or equal to the height differential threshold, this indicates that the data of Point B is inaccurate.

In the figure, Point C represents a point on the vehicle lane line 331 of the road network map, Point C' represents a mapped point, on the mapped vehicle lane line 391, of Point C, obtained by rotating and translating Point C, and Point C" represents a point, on the vehicle lane line 381 in the 3D point cloud road image, positioned in a normal direction of Point C' and closest to Point C'. In the figure, Point C' does not coincide with Point C". The Euclidean distance, the angle differential in the vector direction and the height differential in the world coordinate system between Point C' and Point C" may be further calculated. When the Euclidean distance is less than the Euclidean distance threshold, the angle differential is less than the angle differential threshold, and the height differential is less than the height differential threshold, this indicates that the data of Point C is accurate. When the Euclidean distance is greater than the Euclidean distance threshold, the angle differential is greater than the angle differential threshold, or the height differential is greater than the height differential threshold, this indicates that the data of Point C is inaccurate.

According to the method for testing accuracy of a high-precision map provided by some embodiments of the present disclosure, a differential between a coordinate in the high-precision map and an actual coordinate is first calculated. The accuracy of the high-precision map is then verified according to whether the differential conforming to a preset threshold. In this way, the efficiency in verifying the accuracy of the high-precision map is improved, and the verification precision is improved by verifying a plurality of parameters.

Figure 4:
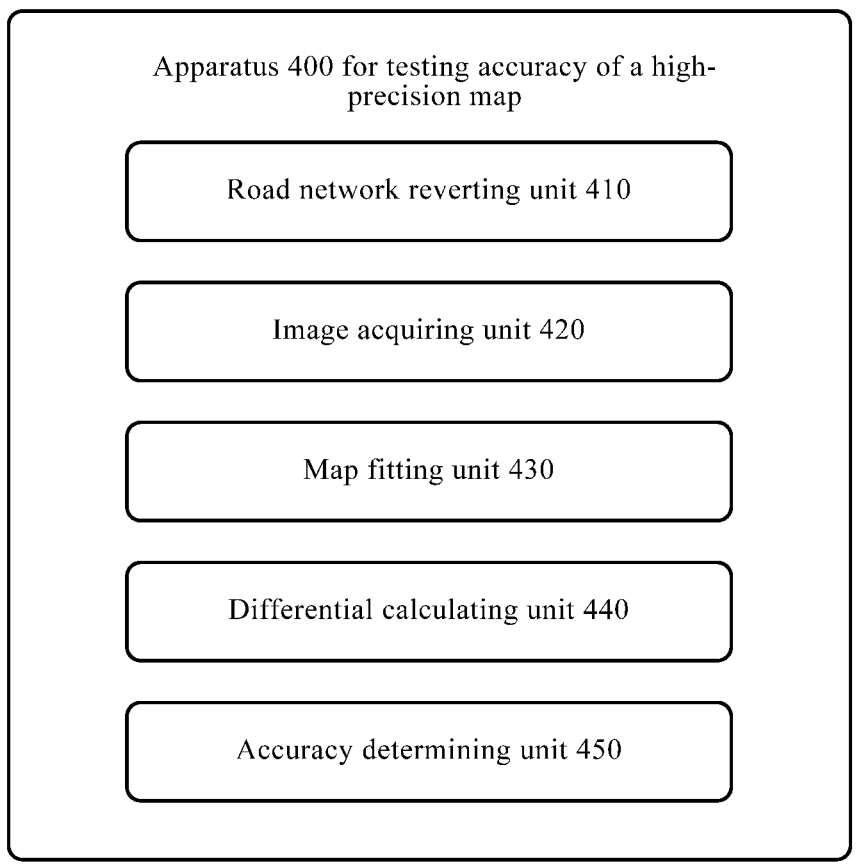
FIG. 4 is a schematic structural diagram of an apparatus for testing accuracy of a high-precision map according to some embodiments of the present disclosure.

Further referring to FIG. 4, as an implementation of the foregoing method, the present disclosure provides some embodiments of an apparatus for testing accuracy of a high-precision map. The apparatus embodiment corresponds to the method embodiment as shown in FIG. 1. Thus, the operation and features described in the above for the method are also applicable to units included in the apparatus 400, which is not repeated any more herein. The apparatus specifically may be applied to various electronic devices.

As shown in FIG. 4, the apparatus 400 for testing accuracy of a high-precision map in some embodiments includes: a road network reverting unit 410, an image acquiring unit 420, a map fitting unit 430, a differential calculating unit 440 and an accuracy determining unit 450.

The road network reverting unit 410 is configured to revert the high-precision map to a road network map.

The image acquiring unit 420 is configured to acquire a 3D point cloud road image labeled with an actual coordinate of a map element.

The map fitting unit 430 is configured to fit the 3D point cloud road image into the road network map to obtain a road network map with the fitted 3D point cloud road image.

The differential calculating unit 440 is configured to calculate a differential between the actual coordinate of the 3D point cloud road image in the road network map with the fitted 3D point cloud road image and a map coordinate in the road network map.

The accuracy determining unit 450 is configured to determine the high-precision map as being accurate in response to the differential being less than or equal to a preset threshold.

In some alternative implementations (not shown in the figure), the image acquiring unit 420 includes: a scanning subunit, configured to scan 3D point cloud information of an actual road via an acquisition device to obtain the 3D point cloud road image; a coordinate calculating subunit, configured to calculate a coordinate, in a world coordinate system, of each point datum in the 3D point cloud road image; and a labeling subunit, configured to label the 3D point cloud road image according to the coordinate, in the world coordinate system, of each point datum in the 3D point cloud road image to obtain the 3D point cloud road image labeled with an actual coordinate.

In some alternative implementations (not shown in the figure), the apparatus further includes: an inaccuracy determining unit, configured to determine the high-precision map as being inaccurate in data in response to the differential being greater than the preset threshold.

In some alternative implementations (not shown in the figure), the differential obtained by calculating by the differential calculating unit includes at least one of: a Euclidean distance, an angle differential in a vector direction, and a height differential in a world coordinate system.

In some alternative implementations (not shown in the figure), the accuracy determining unit is further configured to: determine the high-precision map as being accurate in data in response to each item in the differential being respectively less than or equal to an accurate threshold of the each item. The each item in the differential being less than or equal to an accurate threshold of the each item includes at least one of: the Euclidean distance being less than or equal to a Euclidean distance threshold. The angle differential being less than or equal to an angle differential threshold; and the height differential being less than or equal to a height differential threshold.

In some alternative implementations (not shown in the figure), the inaccuracy determining unit is further configured to: determine the high-precision map as being inaccurate in data in response to any item in the differential being greater than an accurate threshold of the any item. The any item in the differential being greater than the accurate threshold of the any item includes at least one of: the Euclidean distance being greater than the Euclidean distance threshold; the angle differential being greater than the angle differential threshold; and the height differential being greater than the height differential threshold.

Figure 5:
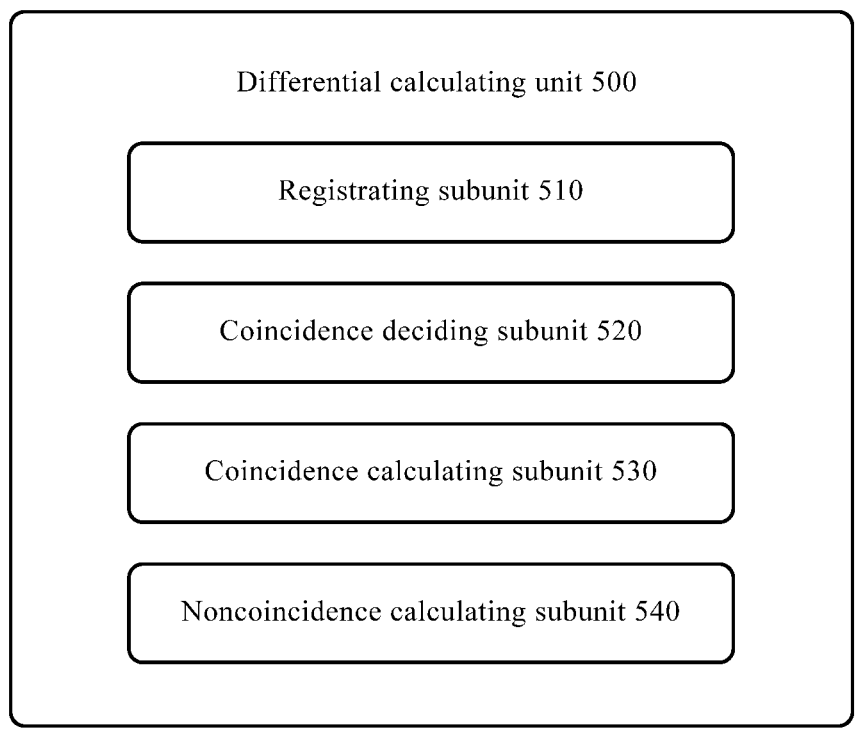
FIG. 5 is a schematic structural diagram of a corresponding differential calculating unit in FIG. 4 according to some embodiments.

Further referring to FIG. 5, as an implementation of the foregoing method, the present disclosure provides some embodiments of the differential calculating unit corresponding to FIG. 4. Some embodiments of the differential calculating unit corresponds to the method embodiment as shown in FIG. 2. Thus, the operation and features described in the above for the method are also applicable to subunits included in the unit 500, which is not repeated any more herein. The unit specifically may be applied to various electronic devices.

As shown in FIG. 5, the differential calculating unit 500 may include: a registrating subunit 510, a coincidence deciding subunit 520, a coincidence calculating subunit 530 and a noncoincidence calculating subunit 540.

The registrating subunit 510 is configured to rotate and translate a road network map element in the road network map with the fitted 3D point cloud road image to obtain a mapped point, in the 3D point cloud road image, of the road network map element. The coincidence deciding subunit 520 is configured to decide whether each mapped point coincides in whole or in part with a point in the 3D point cloud road image. The coincidence calculating subunit 530 is configured to calculate a differential between a single mapped point and a point on the 3D point cloud road image coinciding with the mapped point in response to the single mapped point coinciding in whole or in part with a point in the 3D point cloud road image. The noncoincidence calculating subunit 540 is configured to calculate a differential between a single mapped point and a point, on the 3D point cloud road image, positioned in a normal direction of the single mapped point and closest to the single mapped point in response to the single mapped point not coinciding with a point in the 3D point cloud road image.

Figure 6:
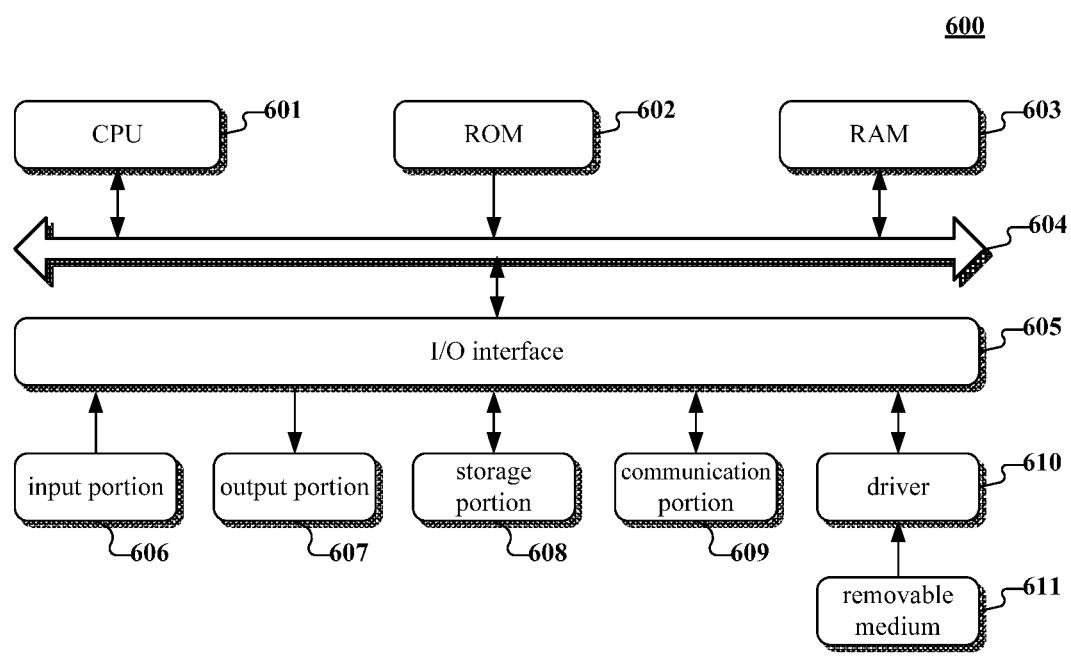
FIG. 6 illustrates a structural schematic diagram of a computer system adapted to implement a terminal device or a server of some embodiments of the present disclosure.

Referring to FIG. 6, a schematic structural diagram of a computer system 600 adapted to implement a terminal apparatus or a server of some embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to some embodiments of the present disclosure, the process described above with reference to the flow chart may be implemented in a computer software program. For example, some embodiments of the present disclosure includes a computer program product, which comprises a computer program that is tangibly embedded in a machine-readable medium. The computer program comprises program codes for executing the method as illustrated in the flow chart. In such embodiments, the computer program may be downloaded and installed from a network via the communication portion 609, and/or may be installed from the removable media 611. The computer program, when executed by the CPU 601, implements the functions as defined by the methods of the present disclosure.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in some embodiments of the present application may be implemented by way of software or hardware. The described units or modules may also be provided in a processor, for example, described as: a processor, comprising a road network reverting unit, an image acquiring unit, a map fitting unit, a differential calculating unit, and an accuracy determining unit, where the names of these units or modules are not considered as a limitation to the units or modules. For example, the road network reverting unit may also be described as "a unit for reverting the high-precision map to a road network map."

In some embodiments, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: revert the high-precision map to a road network map; acquire a 3D point cloud road image labeled with an actual coordinate of a map element; fit the 3D point cloud road image into the road network map to obtain a road network map with the fitted 3D point cloud road image; calculate a differential between the actual coordinate of the 3D point cloud road image in the road network map with the fitted 3D point cloud road image and a map coordinate in the road network map; and determine the high-precision map as being accurate in response to the differential being less than or equal to a preset threshold.

The foregoing is only a description of the embodiments of the present application and the applied technical principles. It should be appreciated by those skilled in the art that the scope of the present application is not limited to the technical solutions formed by the particular combinations of the above technical features. The scope should also cover other technical solutions formed by any combinations of the above technical features or equivalent features thereof without departing from the concept of the disclosure, such as, technical solutions formed by replacing the features as disclosed in the present application with (but not limited to), technical features with similar functions. Various components illustrated in the figures may be implemented as hardware and/or software and/or firmware on a processor, ASIC/FPGA, dedicated hardware, and/or logic circuitry. All of the features disclosed in this specification (including any accompanying claims, abstract and drawings), and/or all of the steps of any method or process so disclosed, may be combined in any combination to form additional embodiments (except combinations where at least some of such features and/or steps are mutually exclusive), all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for testing accuracy of a high-precision map, comprising:
    reverting the high-precision map to a road network map;
    acquiring a 3D point cloud road image labeled with actual coordinates of map elements;
    fitting the 3D point cloud road image with the road network map to obtain a road network map fitted with the 3D point cloud road image;

calculating a differential between an actual coordinate of a map element in the 3D point cloud road image in the road network map fitted with the 3D point cloud road image and a map coordinate of a map element in the road network map; and determining that the high-precision map is accurate in response to determining that the differential is less than or equal to a preset threshold, wherein calculating the differential between the actual coordinate of the map element in the 3D point cloud road image in the road network map fitted with the 3D point cloud road image and the map coordinate of the map element in the road network map comprises:

rotating and translating a road network map element in the road network map fitted with the 3D point cloud road image to obtain a mapped point of the road network map element, in the 3D point cloud road image; and calculating a differential between the mapped point and a point on the 3D point cloud road image, the point on the 3D point cloud road image being positioned in a normal direction of the mapped point and closest to the mapped point in response to the mapped point not coinciding with a point in the 3D point cloud road image, and wherein the method is performed by a processor.

2. The method according to claim 1, wherein acquiring the 3D point cloud road image labeled with the actual coordinate comprises:

obtaining the 3D point cloud road image by scanning 3D point cloud information of an actual road via an acquisition device;

calculating a coordinate, in a world coordinate system, of each point datum in the 3D point cloud road image; and labeling the 3D point cloud road image according to the coordinate, in the world coordinate system, of each point datum in the 3D point cloud road image to obtain the 3D point cloud road image labeled with the actual coordinate.

3. The method according to claim 1, wherein the calculating the differential between the actual coordinate of a map element in the 3D point cloud road image in the road network map fitted with the 3D point cloud road image and the map coordinate of a map element in the road network map further comprises:

calculating a differential between the mapped point and a point on the 3D point cloud road image coinciding with the mapped point in response to the mapped point coinciding in with a point in the 3D point cloud road image, in whole or in part.

4. The method according to claim 1, further comprising:

determining that the high-precision map is inaccurate in response to determining that the differential is greater than the preset threshold.

5. The method according to claim 4, wherein the differential comprises at least one of:

a Euclidean distance, an angle differential in a vector direction, or a height differential in a world coordinate system.

6. The method according to claim 5, wherein determining that the high-precision map is accurate in response to determining that the differential is less than or equal to the preset threshold comprises:

determining that the high-precision map is accurate in response to determining that each item in the differential is less than or equal to an accurate threshold of the each item;

the each item in the differential less than or equal to an accurate threshold of the each item comprising at least one of:

the Euclidean distance being less than or equal to a Euclidean distance threshold;

the angle differential being less than or equal to an angle differential threshold; or the height differential being less than or equal to a height differential threshold.

7. The method according to claim 5, wherein determining that the high-precision map is inaccurate in response to determining that the differential is greater than the preset threshold comprises:

determining that the high-precision map is inaccurate in response to determining that any item in the differential is greater than an accurate threshold of the any item;

the any item in the differential greater than the accurate threshold of the any item comprising at least one of:

the Euclidean distance being greater than a Euclidean distance threshold;

the angle differential being greater than an angle differential threshold; or the height differential being greater than a height differential threshold.

8. An apparatus for testing accuracy of a high-precision map, the apparatus comprising:

at least one processor; and a memory storing instructions, which when executed by the at least one processor, cause the at least one processor to perform operations, the operations comprising:

reverting the high-precision map to a road network map;

acquiring a 3D point cloud road image labeled with actual coordinates of map elements;

fitting the 3D point cloud road image with the road network map to obtain a road network map fitted with the 3D point cloud road image;

calculating a differential between an actual coordinate of a map element in the 3D point cloud road image in the road network map fitted with the 3D point cloud road image and a map coordinate of a map element in the road network map; and determining that the high-precision map is accurate in response to determining that the differential is less than or equal to a preset threshold, wherein calculating the differential between the actual coordinate the map element in the 3D point cloud road image in the road network map fitted with the 3D point cloud road image and the map coordinate of a map element in the road network map comprises:

rotating and translating a road network map element in the road network map fitted with the 3D point cloud road image to obtain a mapped point of the road network map element, in the 3D point cloud road image; and calculating a differential between the mapped point and a point on the 3D point cloud road image, the point on the 3D point cloud road image being positioned in a normal direction of the mapped point and closest to the mapped point in response to the mapped point not coinciding with a point in the 3D point cloud road image.

9. The apparatus according to claim 8, wherein acquiring the 3D point cloud road image labeled with the actual coordinate comprises:

obtaining the 3D point cloud road image by scanning 3D point cloud information of an actual road via an acquisition device;

calculating a coordinate, in a world coordinate system, of each point datum in the 3D point cloud road image; and labeling the 3D point cloud road image according to the coordinate, in the world coordinate system, of each point datum in the 3D point cloud road image to obtain the 3D point cloud road image labeled with the actual coordinate.

10. The apparatus according to claim 8, wherein the calculating the differential between the actual coordinate of a map element in the 3D point cloud road image in the road network map fitted with the 3D point cloud road image and the map coordinate of a map element in the road network map further comprises:

calculating a differential between the mapped point and a point on the 3D point cloud road image coinciding with the mapped point in response to the mapped point coinciding with a point in the 3D point cloud road image, in whole or in part.

11. The apparatus according to claim 8, further comprising:

determining that the high-precision map is inaccurate in response to determining that the differential is greater than the preset threshold.

12. The apparatus according to claim 11, wherein the differential calculated by a differential calculating unit comprising at least one of:

a Euclidean distance, an angle differential in a vector direction, or a height differential in a world coordinate system.

13. The apparatus according to claim 12, wherein determining that the high-precision map is accurate in response to determining that the differential is less than or equal to the preset threshold comprises:

determining that the high-precision map is accurate in response to determining that each item in the differential is less than or equal to an accurate threshold of the each item;

the each item in the differential less than or equal to an accurate threshold of the each item comprising at least one of:

the Euclidean distance being less than or equal to a Euclidean distance threshold;

the angle differential being less than or equal to an angle differential threshold; or the height differential being less than or equal to a height differential threshold.

14. The apparatus according to claim 12, wherein determining that the high-precision map is inaccurate in response to determining that the differential is greater than the preset threshold comprises:

determining that the high-precision map is inaccurate in response to determining that any item in the differential is greater than an accurate threshold of the any item;

the any item in the differential greater than the accurate threshold of the any item comprising at least one of:

the Euclidean distance being greater than a Euclidean distance threshold;

the angle differential being greater than an angle differential threshold; or the height differential being greater than a height differential threshold.

15. A non-transitory computer storage medium storing a computer program, which when executed by one or more processors, cause one or more processors to perform operations, the operations comprising:

reverting a high-precision map to a road network map;

acquiring a 3D point cloud road image labeled with actual coordinates of map elements;

fitting the 3D point cloud road image with the road network map to obtain a road network map fitted with the 3D point cloud road image;

calculating a differential between an actual coordinate of a map element in the 3D point cloud road image in the road network map fitted with the 3D point cloud road image and a map coordinate of a map element in the road network map; and determining that the high-precision map is accurate in response to determining that the differential is less than or equal to a preset threshold, wherein calculating the differential between the actual coordinate of the map element in the 3D point cloud road image in the road network map fitted with the 3D point cloud road image and the map coordinate of the map element in the road network map comprises:

rotating and translating a road network map element in the road network map fitted with the 3D point cloud road image to obtain a mapped point of the road network map element in the 3D point cloud road image; and calculating a differential between the mapped point and a point on the 3D point cloud road image, the point on the 3D point cloud road image being positioned in a normal direction of the mapped point and closest to the mapped point in response to the mapped point not coinciding with a point in the 3D point cloud road image.

* * * * *